US010592356B2

(12) United States Patent
Kamegai et al.

(10) Patent No.: US 10,592,356 B2
(45) Date of Patent: Mar. 17, 2020

(54) MICROCONTROLLER AND ELECTRONIC CONTROL UNIT

(71) Applicant: DENSO CORPORATION, Kariya, Aichi-pref. (JP)

(72) Inventors: Yusuke Kamegai, Kariya (JP); Nobuhiko Makino, Kariya (JP)

(73) Assignee: DENSO CORPORATION, Kariya (JP)

( * ) Notice: Subject to any disclaimer, the term of this patent is extended or adjusted under 35 U.S.C. 154(b) by 297 days.

(21) Appl. No.: 15/423,694

(22) Filed: Feb. 3, 2017

(65) Prior Publication Data

US 2017/0242823 A1 Aug. 24, 2017

(30) Foreign Application Priority Data

Feb. 19, 2016 (JP) .................................. 2016-29870

(51) Int. Cl.
G06F 11/16 (2006.01)
G06F 15/78 (2006.01)
G06F 1/10 (2006.01)
G06F 13/16 (2006.01)

(52) U.S. Cl.
CPC ............ *G06F 11/1637* (2013.01); *G06F 1/10* (2013.01); *G06F 13/1663* (2013.01); *G06F 15/7842* (2013.01)

(58) Field of Classification Search
CPC ..... G06F 15/7853; G06F 1/08; G06F 13/1663
See application file for complete search history.

(56) References Cited

U.S. PATENT DOCUMENTS

| 4,358,823 | A | * | 11/1982 | McDonald | .......... G06F 11/1641 714/11 |
| 4,965,717 | A | * | 10/1990 | Cutts, Jr. | ............... G06F 9/3824 711/148 |
| 6,151,689 | A | | 11/2000 | Garcia et al. | |
| 7,065,599 | B2 | | 6/2006 | King et al. | |
| 2005/0240811 | A1 | * | 10/2005 | Safford | ............... G06F 11/1641 714/11 |
| 2009/0212877 | A1 | * | 8/2009 | Ogasawara | .............. H03B 5/04 331/116 M |

(Continued)

FOREIGN PATENT DOCUMENTS

| JP | 2000-194437 A | 7/2000 |
| JP | 2012-073748 A | 4/2012 |
| JP | 2012-168605 A | 9/2012 |

(Continued)

OTHER PUBLICATIONS

"Microelectromechanical system oscillator," Wikipedia, Feb. 1, 2013. <https://en.wikipedia.org/w/index.php?title=Microelectromechanical_system_oscillator&oldid=749183263>.

(Continued)

*Primary Examiner* — Joseph R Kudirka
(74) *Attorney, Agent, or Firm* — Posz Law Group, PLC

(57) ABSTRACT

A microcontroller includes two processing blocks that respectively have a Central Processing Unit (CPU) and a peripheral circuit, where an access to the peripheral circuit in each of the processing blocks, that is, to a Read-Only Memory (ROM) or a Pulse Width Modulator (PWM) signal generator, is limited only from the CPU disposed in the same processing block. Thereby a fail-safe functionality of the microcontroller is improved.

15 Claims, 14 Drawing Sheets

(56) References Cited

U.S. PATENT DOCUMENTS

2009/0217092 A1    8/2009  Weiberle et al.
2012/0105112 A1*   5/2012  Davis ................. G06F 11/1604
                                                         327/142

FOREIGN PATENT DOCUMENTS

| JP | 2015-103052 A | 6/2015 |
| JP | 2015-176284 A | 10/2015 |
| JP | 2016-060413 A | 4/2016 |

OTHER PUBLICATIONS

Mariani et al. "Comparing fail-safe microcontroller architectures in light of IEC 61508," 22nd IEEE International Symposium on Defect and Fault Tolerance in VLSI Systems, pp. 123-131, Sep. 26-28, 2007.

* cited by examiner

US 10,592,356 B2

MICROCONTROLLER AND ELECTRONIC CONTROL UNIT

CROSS REFERENCE TO RELATED APPLICATION

The present application is based on and claims the benefit of priority of Japanese Patent Application No. 2016-029870, filed on Feb. 19, 2016, the disclosure of which is incorporated herein by reference.

TECHNICAL FIELD

The present disclosure generally relates to an electronic control unit having a microcontroller that includes two or more processing blocks on one semiconductor chip, each of the two or more processing blocks respectively including a CPU and a peripheral circuit.

BACKGROUND INFORMATION

In a system that needs to continue its control even at a time of having a failure in a control device, a system redundancy is provided by multiplexing. For example, a control device disclosed in a patent document, Japanese Patent Laid-Open No. 2012-73748 (Patent document 1) listed below has a double-core CPU, in which one core monitors an operation of the other core by using a watch-dog timer, and when detecting abnormality of one of the two cores, the process performed by the abnormal core is born/performed by the other core in an alternate manner.

However, in the configuration of the patent document 1, the two cores uses one peripheral circuit in a shared manner, which makes it impossible to perform the process of the abnormal core by the other core once abnormality is caused in the peripheral circuit.

SUMMARY

It is an object of the present disclosure to provide a microcontroller and an ECU using such a microcontroller, which are equipped with an improved fail-safe function.

In an aspect of the present disclosure, the microcontroller has, on one semiconductor chip, two or more processing blocks that respectively have a Central Processing Unit (CPU) and a peripheral circuit disposed in the CPU. The peripheral circuit in one processing block is accessible only from the CPU in the same processing block. In such configuration, even when one of the two processing blocks has a failure, the other one of the two processing blocks has no problem in succeeding/continuing a process from the failed/failing processing block and performing the succeeded/delegated process. In other words, delegation of a process from a failed processing block to the other processing block is enabled in such manner.

The microcontroller in another aspect of the present disclosure has a lockstep core as the peripheral circuit, thereby the microcontroller is enabled to detect whether a failure has been caused in the processing blocks by an operation of the lockstep core.

The microcontroller in yet another aspect of the present disclosure has a shared memory that is accessible from each of the CPUs in the processing blocks. In such configuration when, for example, a failure is caused in one of the two or more processing blocks, such an event (i.e., processing of a process) in one processing blocks is transmittable to the other processing block via the shared memory, thereby enabling the process in the failed processing block to be delegated to the other processing block.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

Figure 1:
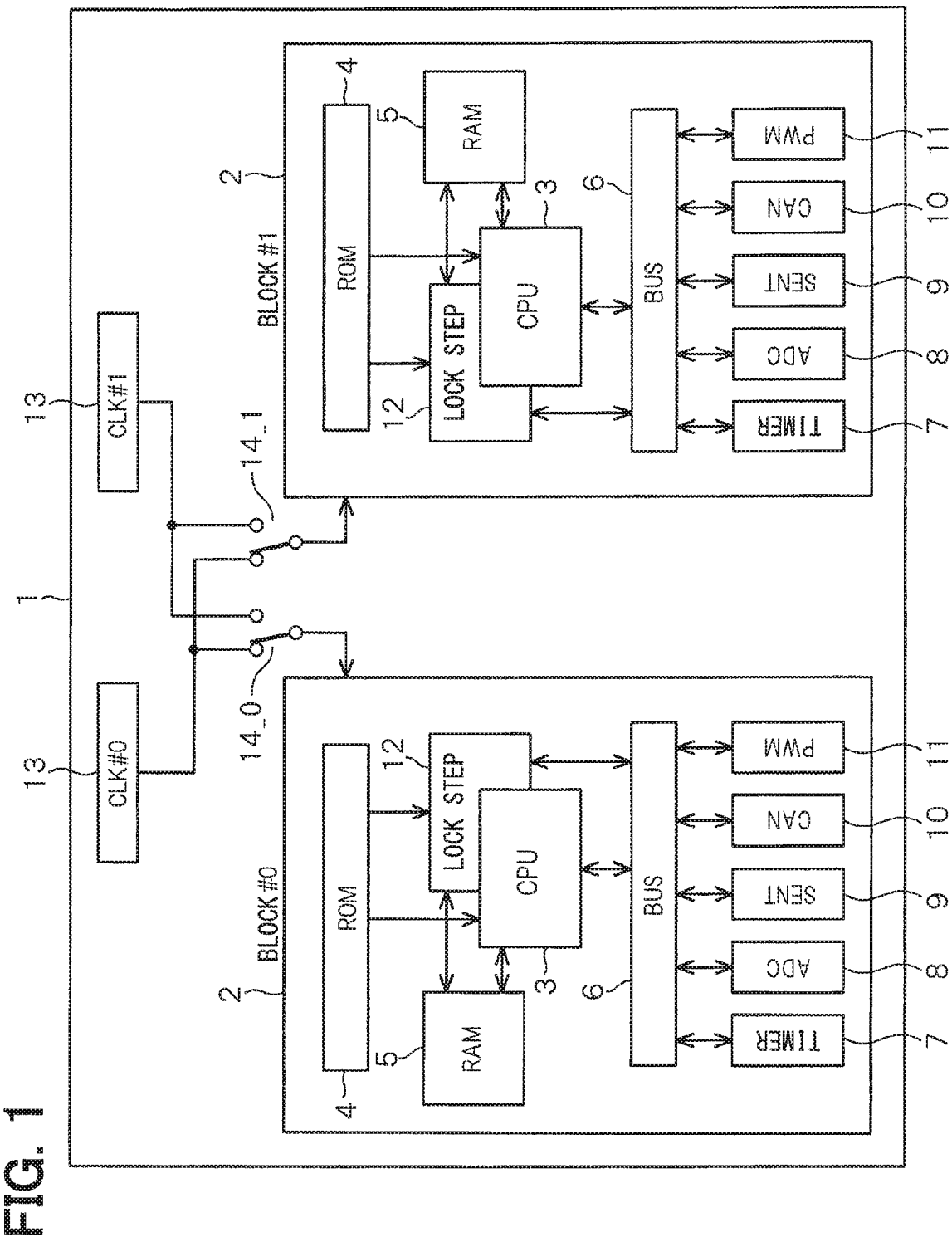
FIG. 1 is a block diagram of a microcontroller in a first embodiment of the present disclosure.

The first embodiment of the present disclosure is described based on the drawing in FIG. 1. A microcontroller 1 of the present embodiment is applied, for example, to a power-steering system of a vehicle, and is provided with two processing blocks 2_0 and 2_1 on one semiconductor chip. "_0" and "_1" in this case correspond to "#0" and "#1" in FIG. 1. The two processing blocks 2 have symmetric configuration. A Central Processing Unit (CPU) 3 uses a Read-Only Memory (ROM) 4 and a Random Access Memory (RAM) 5, for executing a stored control program stored in and read out from the ROM 4 by using the RAM 5 as a work area, and execution of the stored program enables a processing of an intended application.

Further, the CPU 3 accesses each of peripheral circuits, such as a timer 7, an Analog-to-Digital (A/D) converter 8, a Single-Edge Nibble Transmission (SENT) communications unit 9, a Controller Area Network (CAN) communication unit 10, a Pulse Width Modulation (PWM) signal generator 11, and the like via a bus 6. The term "CAN" represents a "Controller Area Network" and is a registered trademark.

A lockstep core 12 accesses, just like the CPU 3, each of the peripheral circuits including the above-described ROM 3 to the PWM signal generator 11 and the like, and monitors the CPU 3 by performing the same process as the CPU 3. When the lockstep core 12 finds a discrepancy in a comparison result, i.e., a comparison between the processing result of the CPU 3 and the processing result of the lockstep core 12, the lockstep core 12 determines that a failure is caused in the CPU 3, and outputs failure caused information.

The peripheral circuits in each of the processing blocks 2 are configured to be accessible from the CPU 3 in the same processing block, and the processing block 2_0 and the processing block 2_1 are non-interfering with each other. Hereafter, the microcontroller 1 is simply designated as the controller 1.

The controller 1 is provided with two clock feeders 13_0 and 1. Clock signals fed from these clock feeders 13_0 and 1 are inputted to two switching circuits 14_0 and 1, and, the two switching circuits 14_0 and 1 switchingly feeds a clock signal from one of the two clock feeders 13_0 and 1 to the two processing blocks 2_0 and 1.

Figure 2:
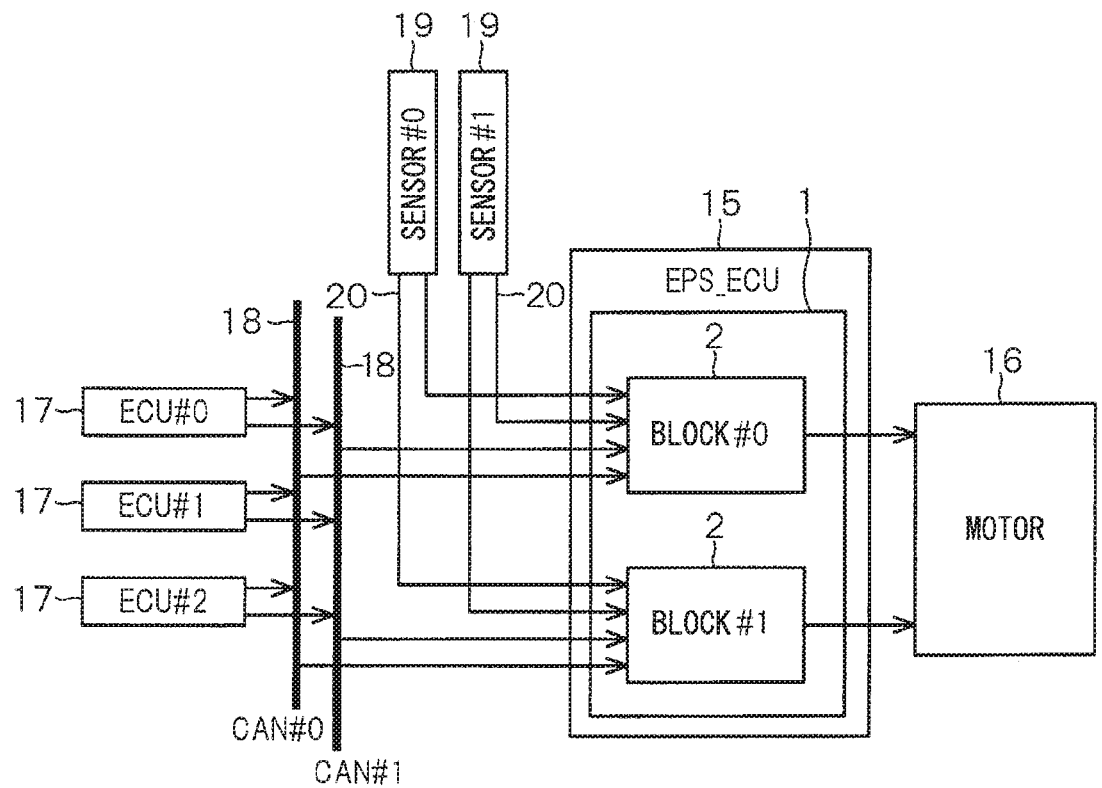
FIG. 2 is a block diagram of an electronic control unit (ECU) that includes the microcontroller shown in FIG. 1 and a control system using such an ECU.

As shown in FIG. 2, an electronic control unit (ECU) 15 is provided with the controller 1, and performs a drive control of a motor 16 that constitutes a power-steering system.

The ECU 15 performs a drive control of the motor 16 via the drive circuits (not illustrated), e.g., an H bridge, an inverter, and the like, more practically.

The motor 16 is equivalent to an actuator in the claims. For example, the stator winding wire of the motor 16 is multiplexed (i.e., duplexed), and the two processing blocks 2_0 and 1 of the controller 1 respectively independently perform the power supply to the two stator winding wires. The drive control is also multiplexed (i.e., duplexed) by a configuration in which the processing blocks 2_0 and 1 perform the same control content for driving the motor 16. Such a configuration is designated as an independent two system method. Note that switching of the switching circuits 14 is also performed by the ECU 15.

When the ECU 15 performs communication with three ECUs 17_0-2 on an instruction side via Control Area Network (CAN), a communication line 18 between the three ECUs 17_0-2 and the two processing blocks 2_0 is also duplexed. That is, the CAN communications unit 10 in each of the three ECUs 17_0-2 is configured to be compatible with such duplexed configuration. The ECU 17 is equivalent to an external controller in the claims.

The ECU 15 receives, from the ECU 17_0-2, a steering angle change instruction for a lane change of a vehicle, for avoiding an obstacle or the like.

Two sensors 19_0 and 1 are sensors which detect a steering angle of a steering wheel, for example, and the sensor signals from the sensors 19_0 and 1 are inputted to each of the processing blocks 2_0 and 1 by SENT communication. A communication line 20 of the SENT communication is also duplexed for communication to each of the processing blocks 2_0 and 1.

Next, the operation of the present embodiment is described.

Figure 3:
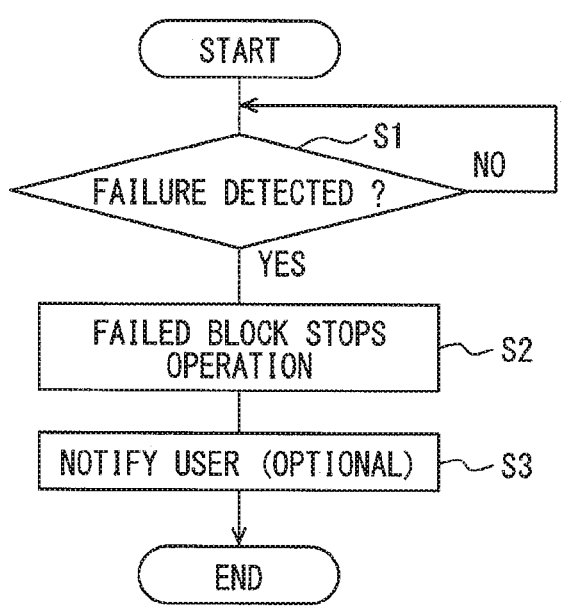
FIG. 3 is a flowchart of a process performed by each of processing blocks in the ECU.

Each of the processing blocks 2_0 and 1 performs a process shown in FIG. 3. When the CPU 3 detects that a failure is caused in one processing block 2 by, for example, using the lockstep core 12 (S1; YES), the failure-caused processing block 2 stops operation (S2). That is, when the processing block 2_0 fails, a drive control of the motor 16 is henceforth performed only by the processing block 2_1.

In such case, if a decrease of the number of the driving processing blocks for simultaneously driving the motor 16 from "2" to "1" poses a problem such as an insufficient output power from the motor 16, the output power from the motor 16 may be adjusted, i.e., may be doubled, for compensation. Note that a failure of one of the two processing blocks 2 may be notified to a user by transmitting failure information to the ECU 17 on the instruction side, even though it is optional (S3).

Further, the failure detection in Step S1 may be performed not only by the lockstep core 12 but by following procedures.

When a memory abnormality is detected by an Error Checker and Corrector (ECC) about the RAM 5, for example, operation of a processing block is stopped by software.

When abnormality of CAN communication is detected by the ECU 17, an operation stop instruction is transmitted to the processing block 2. In such case, the ECU 17 is equivalent to a communication monitor in the claims.

When it is determined that there is a certain failure based on an unexpected operation of software, operation of a processing block is stopped by software.

According to the present embodiment, the controller 1 is equipped with two processing blocks 2 in each of which the CPU 3 and its peripheral circuit are disposed as mentioned above. The peripheral circuits, i.e., the ROM 3 to the PWM signal generator 1, are configured to be accessibly only from the CPU 3 disposed in the same processing block 2 as the respective peripheral circuits.

Thereby, even when a failure results in any one of the processing blocks 2, the process performed by the failed processing block 2 can be performed by, i.e., delegated to, the other processing block 2 without causing any problem. Further, since the processing block 2 is equipped with the lockstep core 12 as one of the peripheral circuits, a failure of the processing block 2 is monitored by the operation of the lockstep core 12.

Further, the controller 1 has the two clock feeders 13, and the clock signal from one of the two clock feeders 13 is configured to be selectively supplied to each of the processing blocks 2 via the switching circuit 14. Therefore, clock signal feeding is also made redundant.

In addition, the communication line 18 is multiplexed in order to input the signal to the controller 1 from the ECU 17 on the instruction side, and, based on the signal from the ECU 17, the motor 16, i.e., one motor, is driven by using the two processing blocks 2.

Thereby, even when a failure is caused in one of the two processing blocks 2 of the ECU 15, the drive control of the motor 16 is continuable by the other one of the processing blocks 2. Further, by a monitoring of CAN communication by using the ECU 17, when abnormality is caused in communication, the switching of the processing blocks 2 is enabled.

Second Embodiment

Hereafter, the same components as the first embodiment have the same numerals assigned thereto for not repeating the same description.

Figure 4:
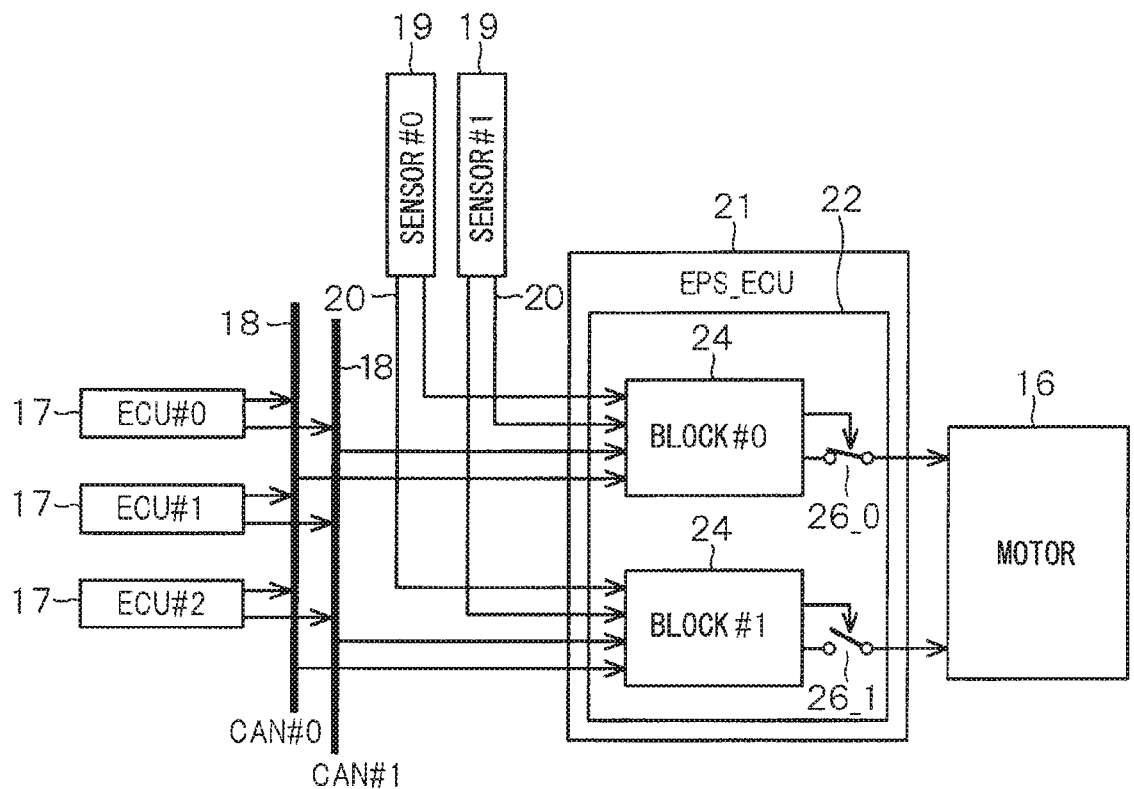
FIG. 4 is a block diagram of the ECU and the control system in a second embodiment of the present disclosure, including the microcontroller shown in FIG. 5.

As shown in FIG. 4, an ECU 21 of the second embodiment is provided with a controller 22 replacing the controller 1.

Figure 5:
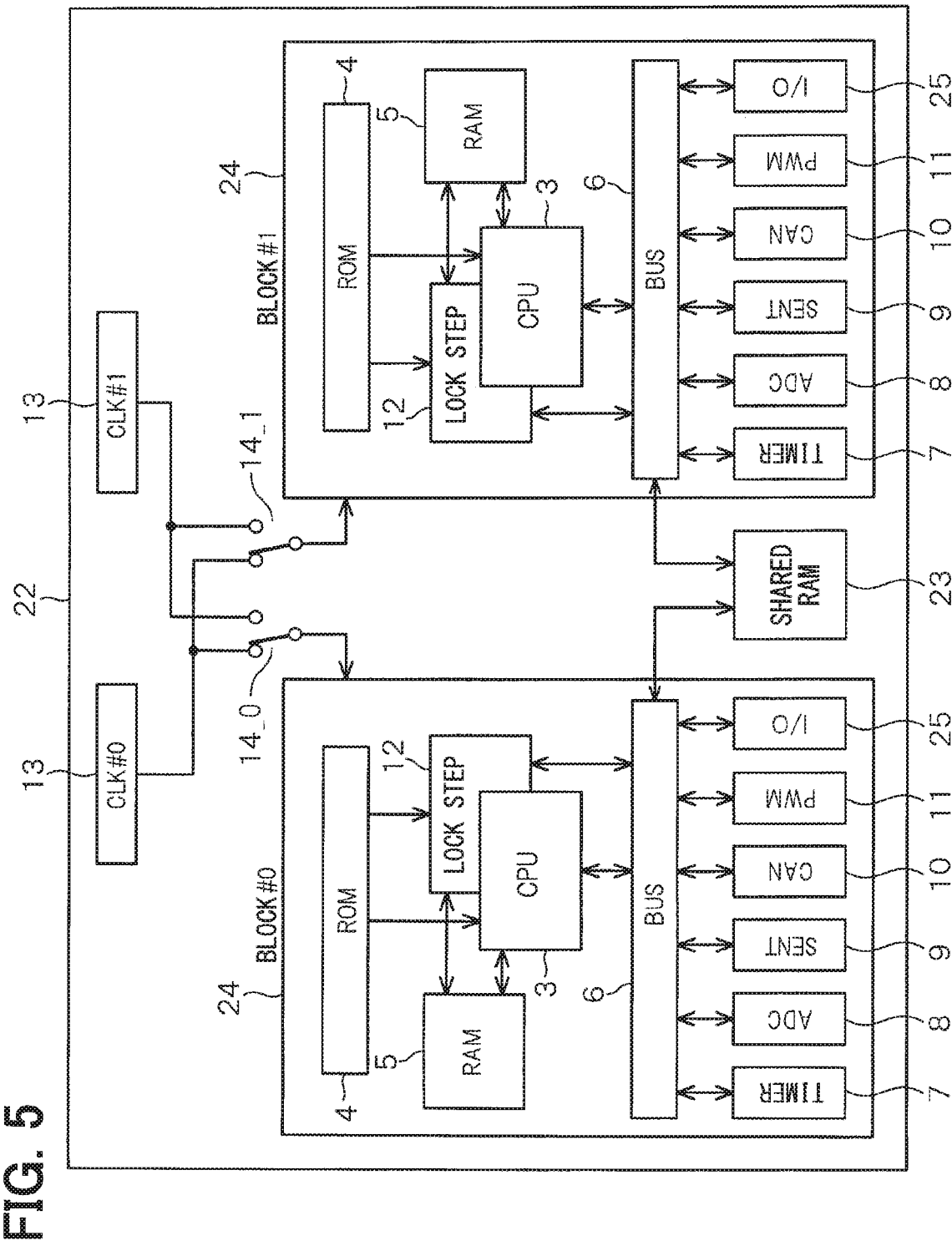
FIG. 5 is a block diagram of the microcontroller in the second embodiment of the present disclosure.

As shown in FIG. 5, the controller 22 is provided with a shared RAM 23 that is equivalent to a shared memory in the claims, and the CPU 3 in each of processing blocks 24_0 and 1 has access to the shared RAM 23 via the bus 6 and an arbitrator (not illustrated) in each of the blocks 24.

Each of the processing blocks 24 is provided with an I/O 25 that is connected to the bus 6 as one of the peripheral circuits. As shown in FIG. 4, at a position between each of the processing blocks 24 and the motor 16, a switch 26 for cutting an output is arranged, and the CPU 3 controls ON/OFF of the switch 26 according to a setup stored in the register.

Next, the operation of the second embodiment is described.

Each of the two processing blocks 24 simultaneously performs the same control content, which is the same as the first embodiment. Further, in the second embodiment, one of the two processing blocks 24 performs a drive control of the motor 16, which is a so-designated as a hot standby method. In the following description, the processing block 24, which performs a drive control of the motor 16 is designated as a "control block", and the processing block 24 which is in a standby state without performing a drive control of the motor 16 is designated as a "standby block."

Figure 6:
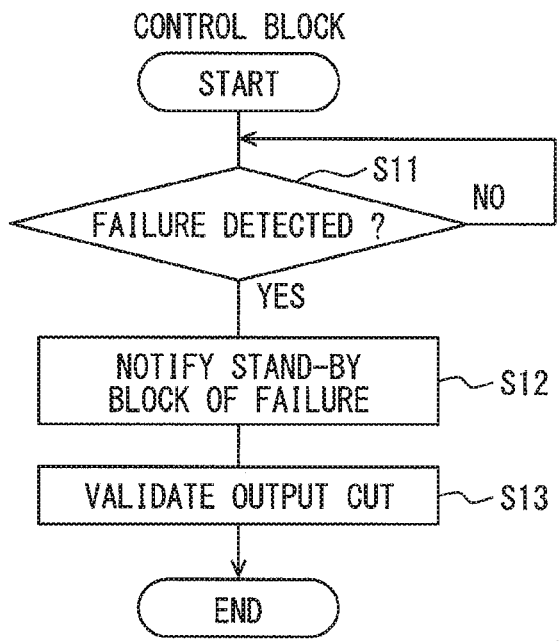
FIG. 6 is a flowchart of a process performed by a control block.

In the initial state, the control block 24 puts the switch 26 in an ON state, and the standby block 24 puts the switch 26 in an OFF state. Then, as shown in FIG. 6, the control block 24 notifies, upon detecting failure in the same manner as described in Step S1 (S11; YES), an occurrence of failure to the standby block 24 (S12). Such a notice may be performed by setting a "failure occurrence flag" to a specific address of the shared RAM 23, which is pre-defined. Then, by putting the switch 26 to an OFF state, for "validating an output cut" (S13)", the process is finished.

Figure 7:
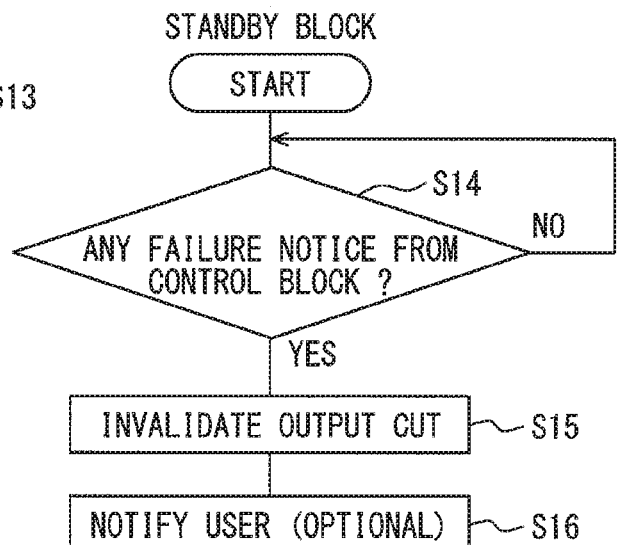
FIG. 7 is a flowchart of a process performed by a standby block.

On the other hand, the standby block 24 polls, as shown in FIG. 7, the above-mentioned specific address of the shared RAM 23, waiting for a failure notice, notifying an occurrence of failure, from the control block 24 (S14).

Then, upon confirming that the failure occurrence flag is set (S14; YES), the standby block 24 puts the switch 26 to an ON state, for "invalidating the output cut" (S15). In such manner, the standby block 24 is turned to the control block 24. Then, just like Step S3, a notice to the user may be provided (S16), which is optional.

As mentioned above, according to the second embodiment, by having the shared RAM 23 to which the CPU 3 disposed in each of the processing blocks 24 has access in common, in case that a failure occurs in one of the processing blocks 24, such an event is transmitted to the other processing block 24 via the shared RAM 23, thereby enabling a delegation of performing the process to the other processing block 24.

Third Embodiment

In the third embodiment, even though the ECU 21 is the same as the one in the second embodiment, the two processing blocks 24 do not perform the same process for controlling the same motor 16. That is, for example, while the processing block 24_U controls the motor 16, the processing block 24_1 performs control of other control objects other than the motor 16, as an assumption. Then, in case that a failure occurs in the processing block 24_0, the controller 22 transitions to a so-called degeneration control by delegating a control of the motor 16 to the processing block 24_1.

Therefore, during a drive control of the motor 16, the processing block 24_0 writes, to the shared RAM 23, information required for a delegation of the drive control of the motor 16 to the processing block 24_1 as required.

Figure 8:
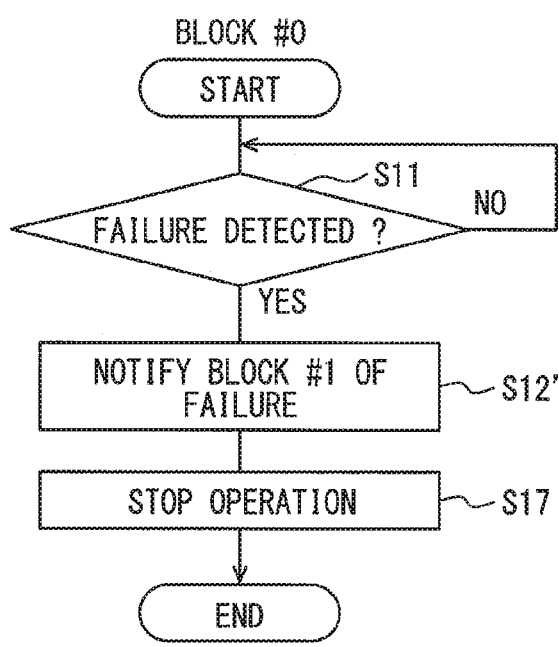
FIG. 8 is a flowchart of a process performed by one of two processing blocks in a third embodiment of the present disclosure.

Then, upon detecting a failure in the processing block 24_0 as shown in FIG. 8 (S11; YES), an occurrence of failure is notified to the processing block 24_1)(S12'). Then operation of the processing block 24_0 is slopped (S17).

Figure 9:
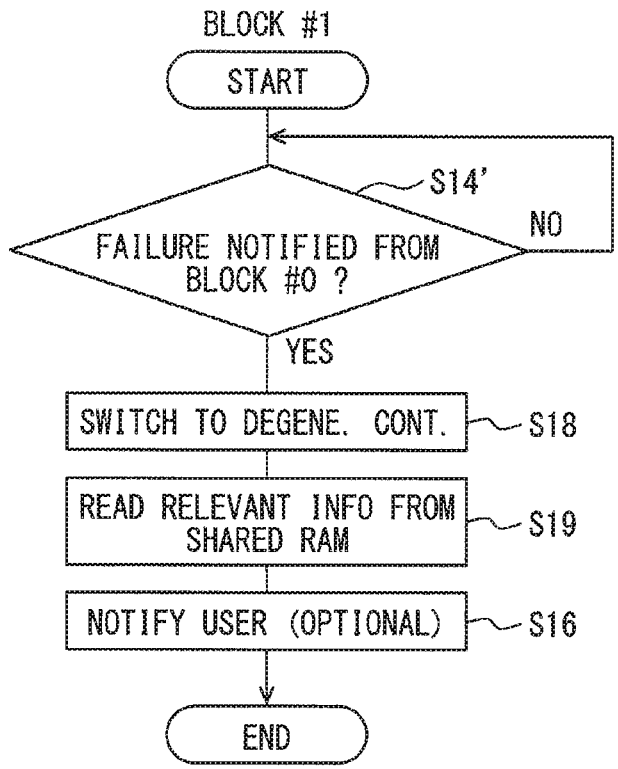
FIG. 9 is a flowchart of a process performed by other one of the two processing blocks in the third embodiment of the present disclosure.

On the other hand, as shown in FIG. 9, the processing block 24_1 controls the other control objects while the processing block 24_0 performs a drive control of the motor 16, monitoring whether any failure notice has arrived from the processing block 24_0 just like the second embodiment (S14').

Then, upon receiving a failure notice notifying an occurrence of failure from the processing block 24_0 (S14'; YES), an operation state is switched to the degeneration control (S18). In such case, the processing block 24_1 reads the information required for a drive control of the motor 16 from the shared RAM 23, which has been written thereto by the processing block 24_0 (S19).

According to the third embodiment, the degeneration control method is performable by the ECU 21 as mentioned above.

Fourth Embodiment

Figure 10:
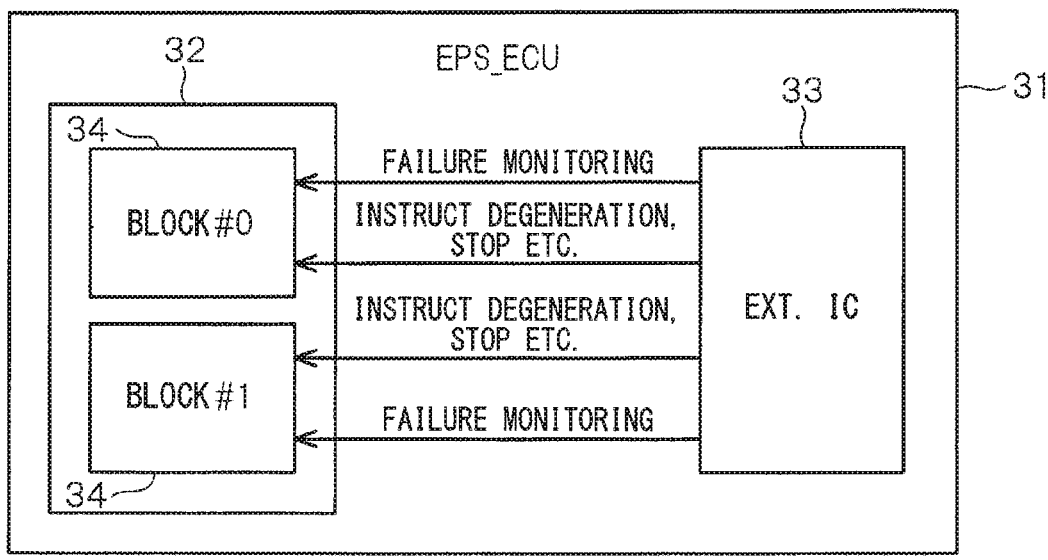
FIG. 10 is a block diagram of the ECU in a fourth embodiment of the present disclosure.

Although an ECU 31 of the fourth embodiment shown in FIG. 10 adopts the degeneration control method, just like the third embodiment, the ECU 31 has a controller 32 and an external Integrated Circuit (IC) 33 for performing the degeneration control.

The controller 32 is provided with two processing blocks 34_0 and 1, and the external IC 33 performs an abnormality monitor and a failure detection of the two processing blocks 34 together with providing an instruction for switching to the degeneration control and the like.

The external IC 33 performs the abnormality monitor of the processing blocks 34 in the following methods, for example.

Just like using a watchdog timer, each of the processing blocks 34 periodically transmits a pulse signal to the external IC 33, for example. The external IC 33 then detects a failure of the processing blocks 34, when transmission of the pulse signal stops or the transmission cycle becomes abnormal.

When communication format of communication performed between the processing block 34 and the external IC 33 is different from what is defined beforehand, the external IC 33 detects a failure of the processing block 34.

Next, the operation of the fourth embodiment is described.

Figure 11:
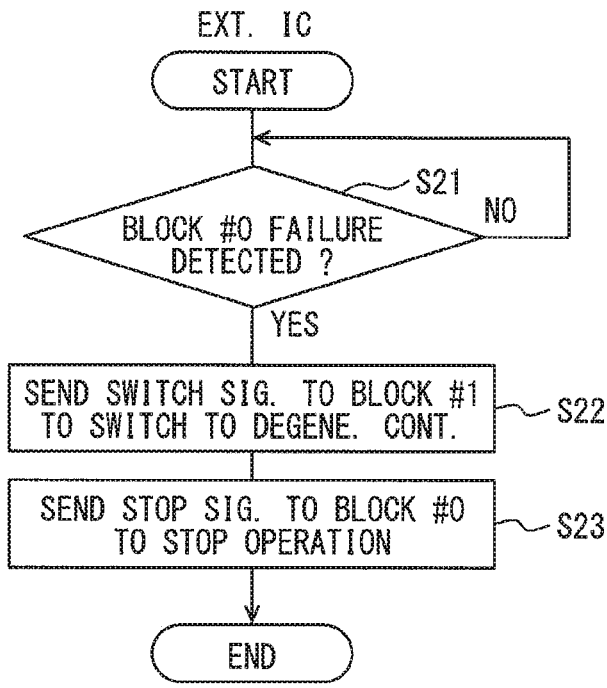
FIG. 11 is a flowchart of a process performed by an external integrated circuit (IC)

Just like the third embodiment, the processing block 34_0 controls the motor 16, and the processing block 34_1 controls the control objects other than the motor 16. As shown in FIG. 11, the external IC 33 monitors whether a failure has occurred in the processing block 34_0 as mentioned above (S21), and, upon detecting an occurrence of failure (S21; YES), the external IC 33 transmits an instruction signal to the processing block 34_1, for the switching to the degeneration control (S22). Then, the external IC 33 transmits, to the processing block 34_0, a stop signal that instructs the processing block 34_0 to stop operation (S23).

Figure 12:
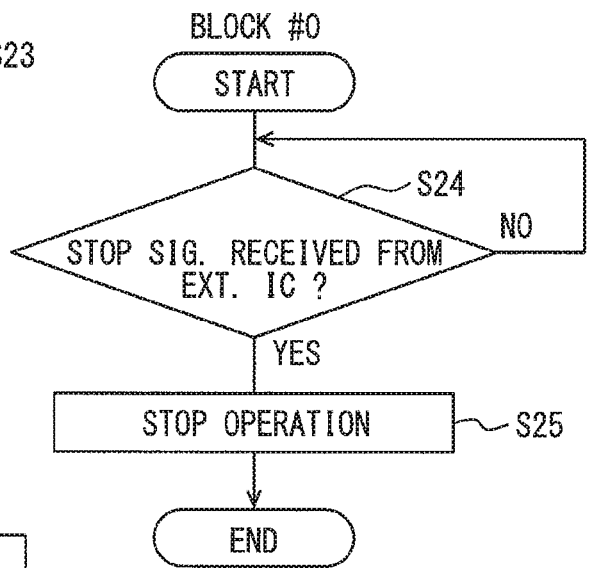
FIG. 12 is a flowchart of a process performed by one of the two processing blocks in the fourth embodiment of the present disclosure.

As shown in FIG. 12, the processing block 34_0 stops operation (S25), upon receiving the stop signal from the external IC 33 (S24; YES).

Figure 13:
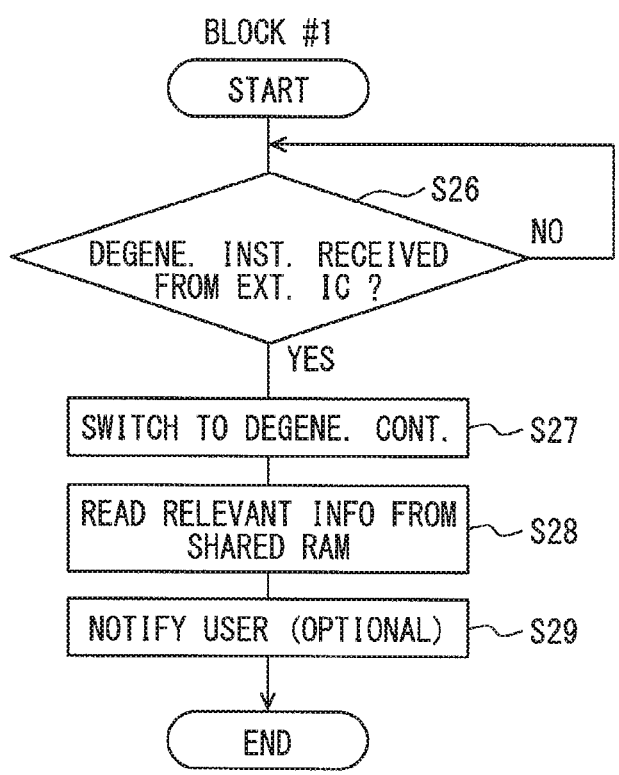
FIG. 13 is a flowchart of a process performed by other one of the two processing blocks in the fourth embodiment of the present disclosure.

On the other hand, as shown in FIG. 13, upon receiving a signal that instructs the switching to the degeneration control from the external IC 33 (S26; YES), the processing block 34_1 switches to the degeneration control (S27). Then, the same processes as Step S19 and Step S16 are performed (S28, S29). Note that processes other than the main feature of the fourth embodiment are omitted from the flowcharts shown in FIGS. 11-13.

As mentioned above, according to the fourth embodiment, since the ECU 31 is equipped with the external IC 33 and the operation of the processing blocks 34 is monitored by the external IC 33, the switching to the degeneration control is performable when a failure occurs in one of the processing blocks 34.

Fifth Embodiment

According to the fifth embodiment, by using the ECU 31 of the fourth embodiment, for example, a drive control of the motor 16 is performed by one of the processing blocks 34, and the other one of the processing blocks 34 stops its operation. The numerals of the components are the same as the second embodiment. In the fifth embodiment, a so-called cold standby method is adopted, in which, when one control block 34 has a failure occurring therein, a subject of the control is switched to the other control block 34, i.e., to a standby control block, for performing the drive control of the motor 16.

Next, the operation of the fifth embodiment is described.

Figure 14:
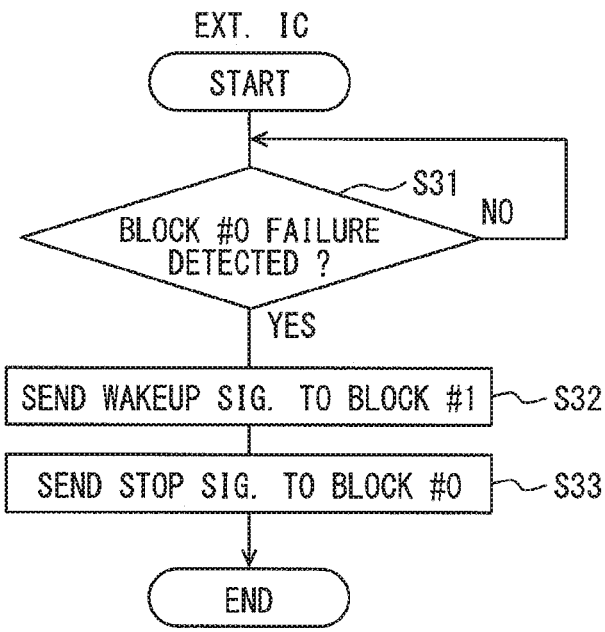
FIG. 14 is a flowchart of a process performed by the external integrated circuit (IC) in a fifth embodiment of the present disclosure.

The processing block 34_0 is, for example, assumed as a control block, and the processing block 34_1 is assumed as a standby block. As shown in FIG. 14, upon detecting a failure in the processing block 34_0 (S31; YES), the external IC 33 starts an operation of the processing block 34_1 by transmitting a wakeup signal (S32). Then, the external IC 33 transmits a stop signal to the processing block 34_0, and stops the operation of the processing block 340 (S33).

Figure 15:
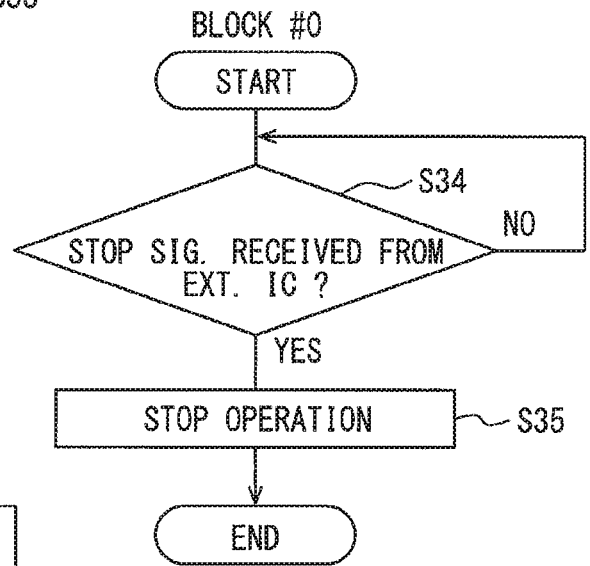
FIG. 15 is a flowchart of a process performed by one of the two processing blocks in the fifth embodiment of the present disclosure.
Figure 16:
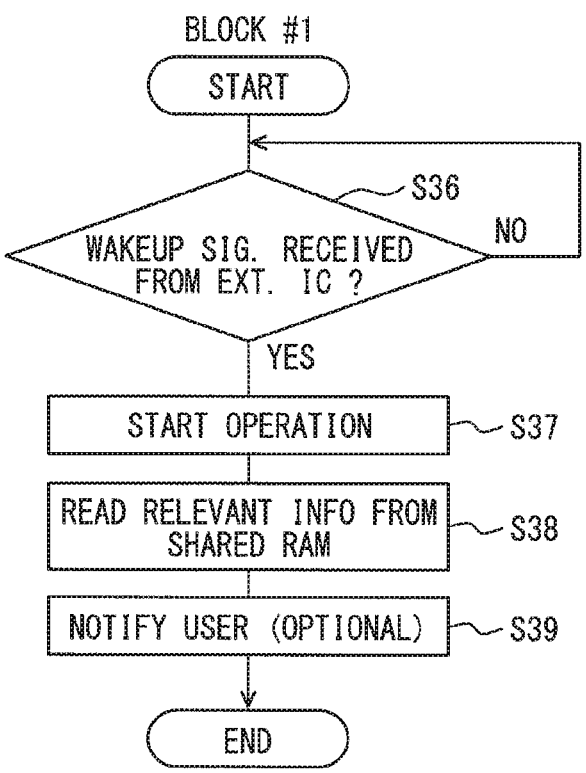
FIG. 16 is a flowchart of a process performed by other one of the two processing blocks in the fifth embodiment of the present disclosure.

As shown in FIG. 15, the processing block 34_0 stops the operation (S35), upon receiving the stop signal (534; YES). As shown in FIG. 16, the processing block 34_1 starts the operation (S37), upon receiving the wakeup signal (S36; YES). Then, the same processes as Step S19 and Step S16 are performed (S38, S39).

According to the fifth embodiment, the ECU 31 is capable of performing the cold standby method, as mentioned above.

Sixth Embodiment

Figure 17:
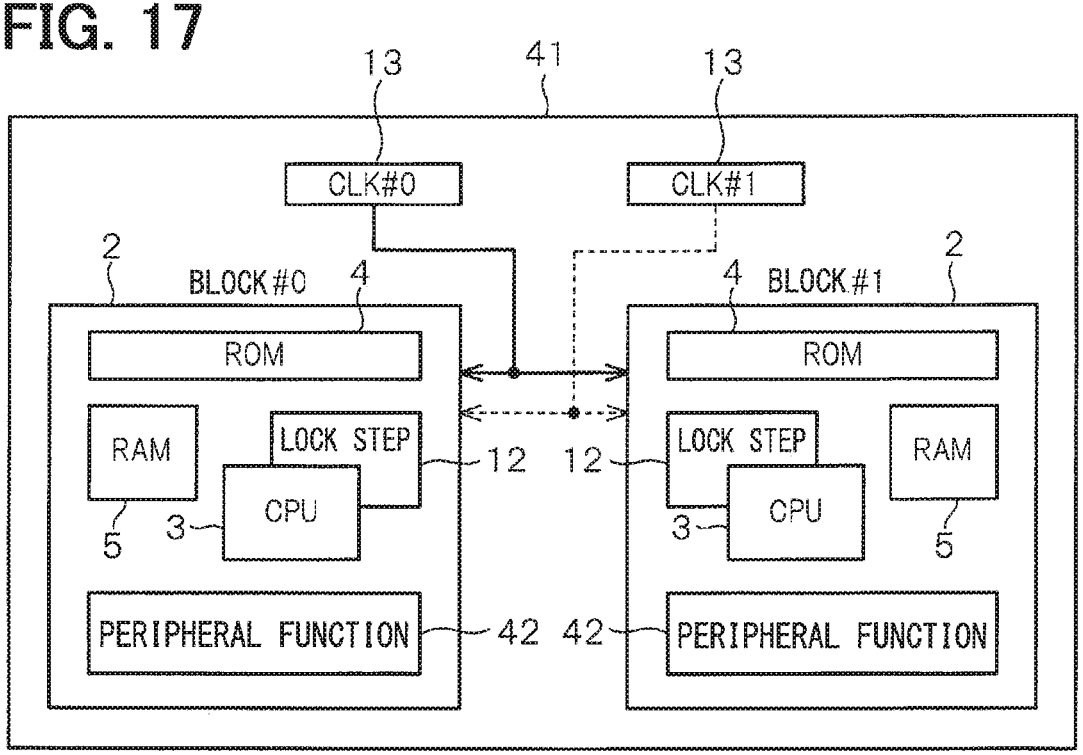
FIG. 17 is a block diagram of the microcontroller in a sixth embodiment of the present disclosure.

A controller 41 of the sixth embodiment shown in FIG. 17 has a similar configuration to the controller 1 of the first embodiment, while the controller 41 is different therefrom only by a clock signal feeding method.

Regarding the peripheral circuits such as the bus 6 to the PWM signal generator 11 and the like, a peripheral function 42 collectively represents such circuits for illustration purposes.

In the sixth embodiment, one of the two clock feeders 13_0 and 1 feeds the clock signal to one of the two processing blocks 2_0 and 1, without using the switch 14. For example, only one of the clock feeders 13_0 and 1 is configured to operate. In such case, the clock path between the clock feeder 13_0, or 1, and the processing blocks 2_0 and 1 may be a common path.

As mentioned above, according to the sixth embodiment, when having the two clock feeders 13_0 and 1, the clock signal is provided to each of the processing blocks 2_0 and 1 from only one of the clock feeders 13. In such manner, the clock signal feeding system/method is made redundant.

Seventh Embodiment

Figure 18:
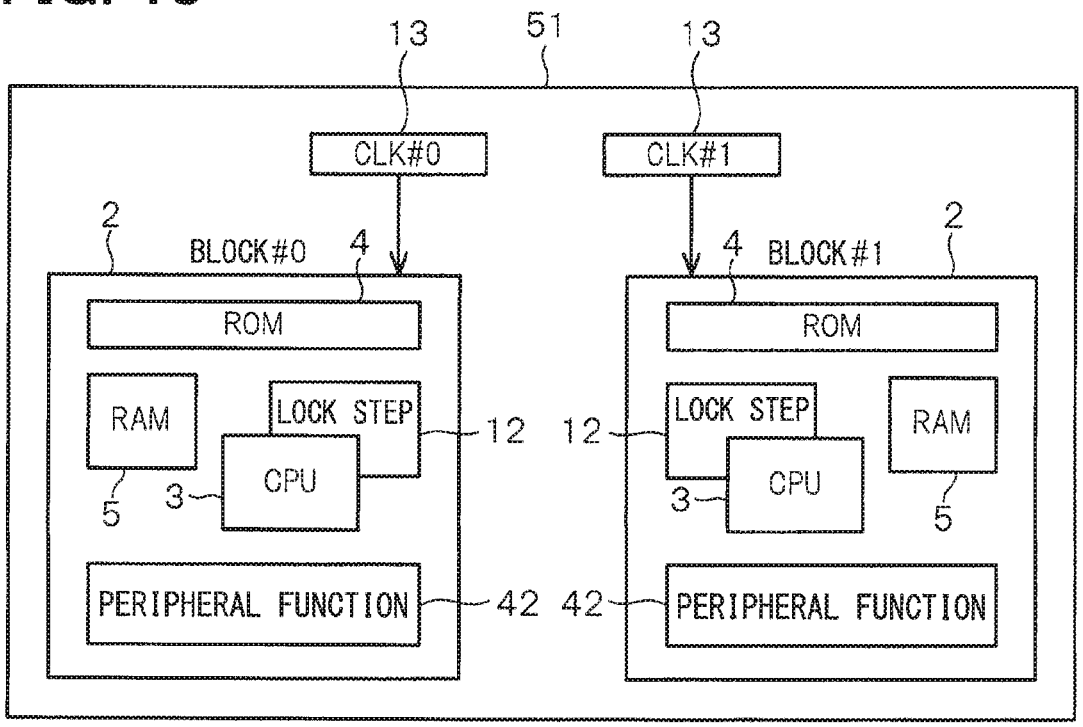
FIG. 18 is a block diagram of the microcontroller in a seventh embodiment of the present disclosure.

A controller 51 of the seventh embodiment shown in FIG. 18 has a similar configuration to the controller 41 of the sixth embodiment, with a difference therefrom provided as a clock signal feeding method.

That is, the clock feeder 13_0 feeds the clock signal to the processing block 2_0, and the clock feeder 13_1 feeds the clock signal to the processing block 2_1, in a fixed, i.e., non-changing, manner.

According to the clock signal feeding configured in such manner, even when one of the two clock feeders 130 and 1 is interrupted, the process is continuable by the processing block 2 on the other side.

Eighth to Tenth Embodiments

Figure 19:
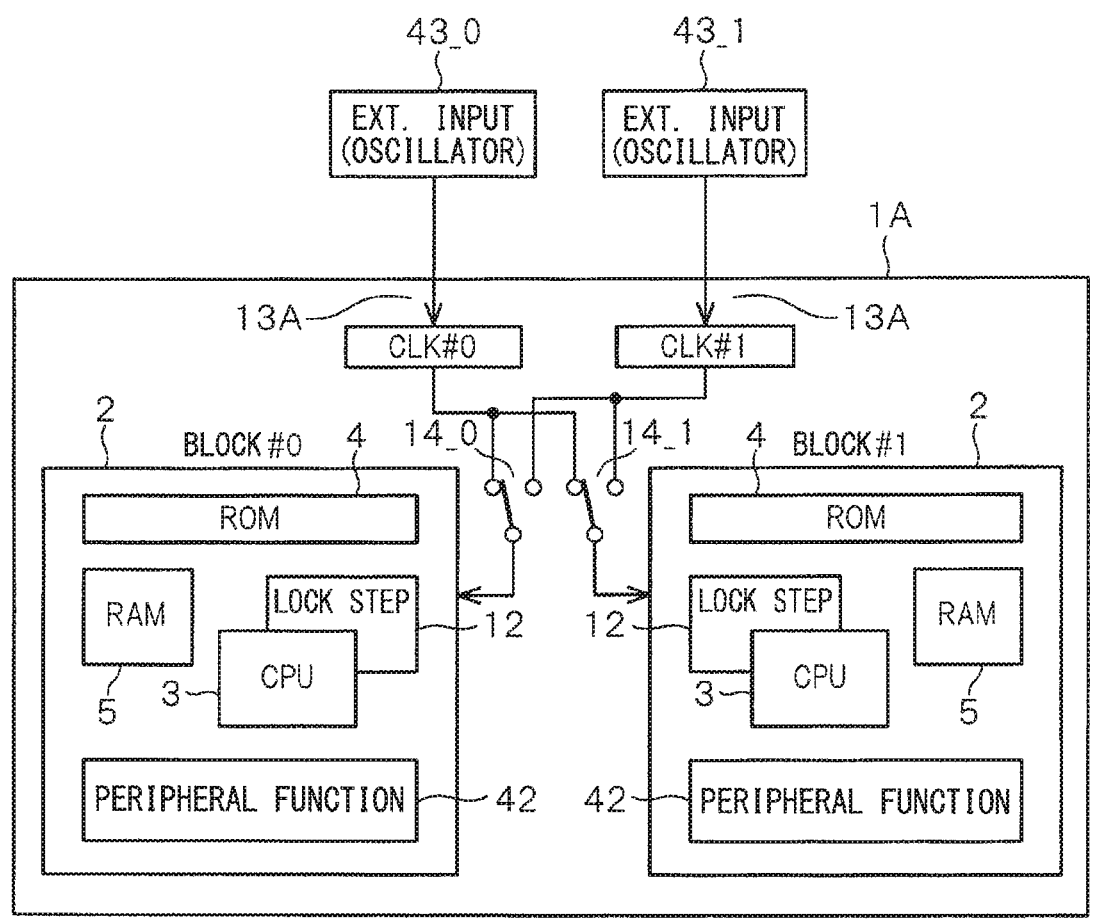
FIG. 19 is a block diagram of the microcontroller in an eighth embodiment of the present disclosure.
Figure 20:
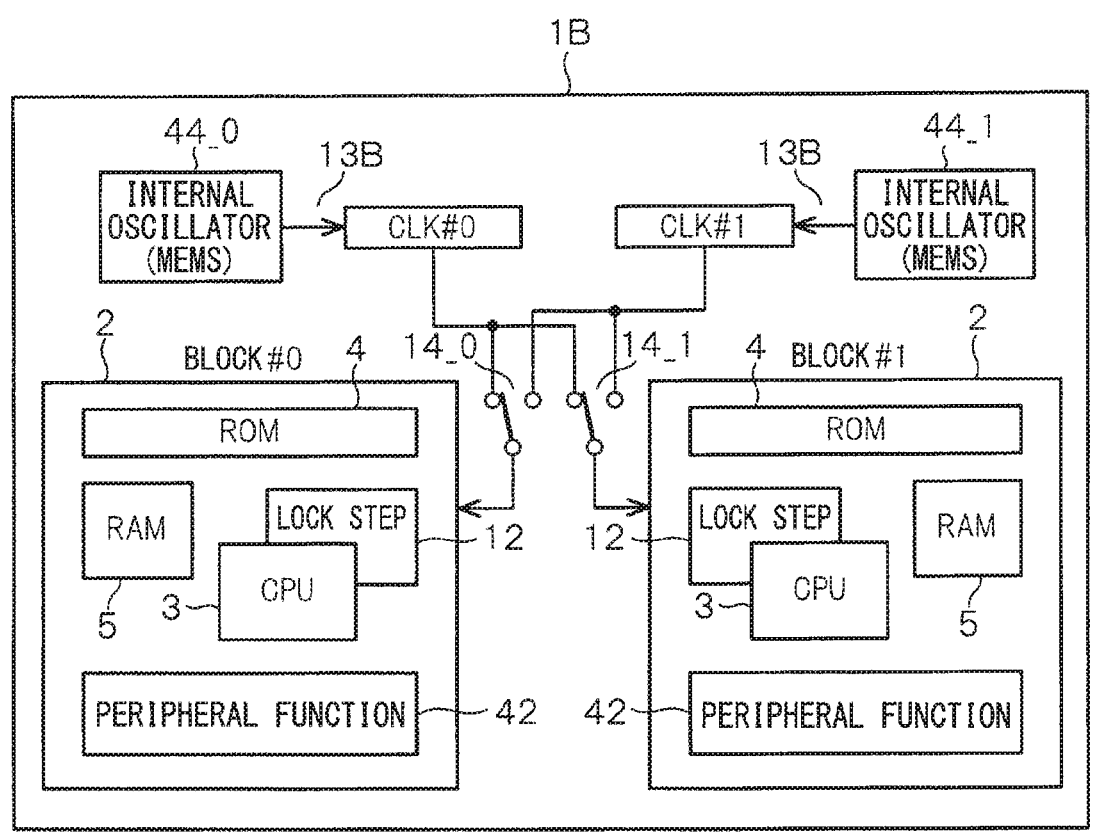
FIG. 20 is a block diagram of the microcontroller in a ninth embodiment of the present disclosure.
Figure 21:
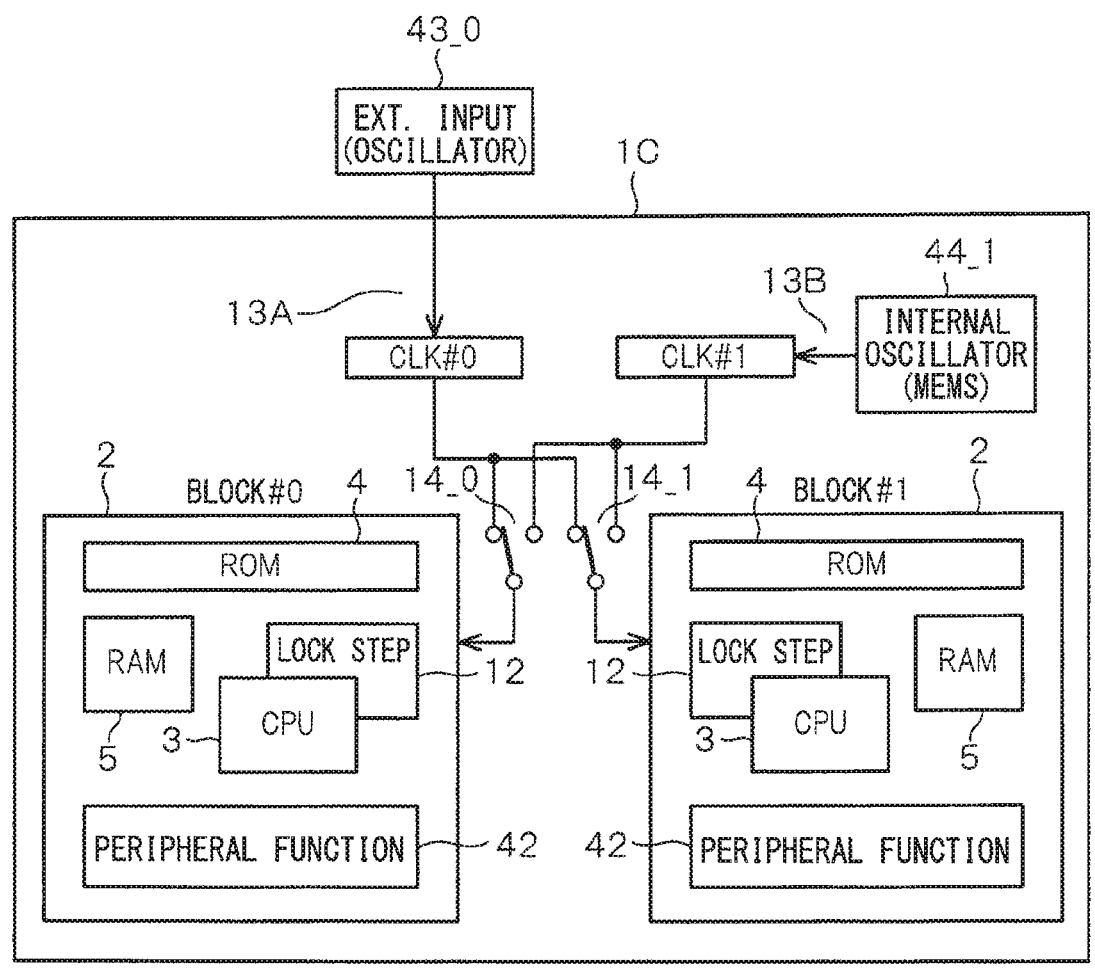
FIG. 21 is a block diagram of the microcontroller in a tenth embodiment of the present disclosure.

Controllers 1A-1C of the eighth to the tenth embodiments shown in FIGS. 19-21 are the variations of the details of the clock feeder 13 in the controller 1 of the first embodiment.

The controller 1A of the eighth embodiment shown in FIG. 19 has a configuration in which each of clock feeders 13A uses an external oscillator 43 as a source of the oscillation of the clock signal, respectively.

The controller 1B of the ninth embodiment shown in FIG. 20 has a configuration in which each of clock feeders 13B has a built-in Micro Electro-Mechanical Systems (MEMS) oscillator 44 as a source of the oscillation of the clock signal, respectively. About the detailed configuration of the MEMS oscillator 44, please refer to the disclosure of JP 2009-200888 A or the like, for example.

The controller 10 of the tenth embodiment shown in FIG. 21 has a configuration in which the processing block 2_0 uses the clock feeder 13A and the processing block 2_1 uses the clock feeder 13B.

According to the configurations of the eighth to the tenth embodiments mentioned above, the same effects as the first embodiment are achievable.

Eleventh Embodiment

Figure 22:
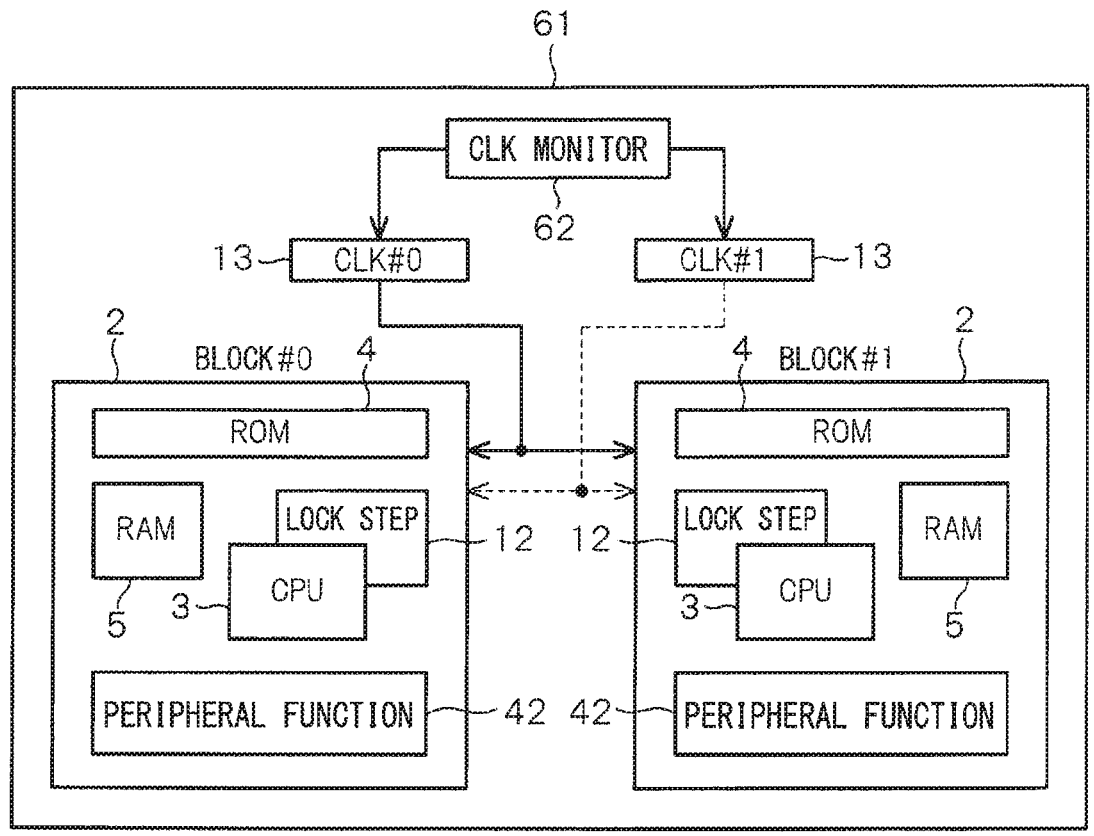
FIG. 22 is a block diagram of the microcontroller in an eleventh embodiment of the present disclosure.

A controller 61 of the eleventh embodiment shown in FIG. 22 has a configuration of having a clock monitor 62 added to the controller 41 of the sixth embodiment.

Figure 23:
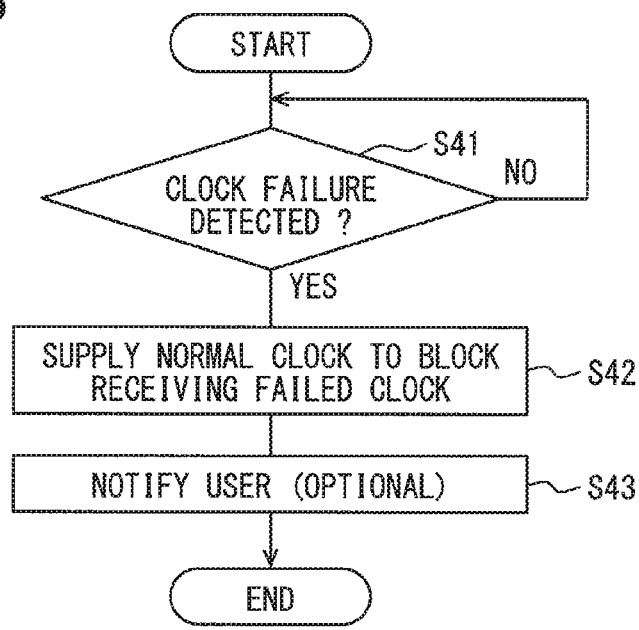
FIG. 23 is a flowchart of a process performed by a clock monitor.

The clock monitor 62 monitors whether the oscillation operation of the clock feeders 13 is normal by referring to an oscillation frequency, for example. That is, when an oscillation frequency is within an allowable range of less than ±several percentages relative to a reference value, it is determined that the oscillation operation is normal (FIG. 23, S41; NO).

In case that the oscillation frequency exceeds the allowable range and is thus determined as abnormal (S41; YES), the normal clock signal is fed to the processing block 2 to which the determined-as-abnormal clock signal has been fed (542), and the user is notified, as required (S43).

For example, as shown in FIG. 22, when the clock signal from the clock feeder 13_0 is fed to the processing block 2_0 and 1 in the initial state, the clock feeder 13_0 is assumed as being determined as abnormal.

Then, the clock monitor 62 stops the operation of the clock feeder 13_0, and, by enabling an output of the clock signal from the clock feeder 13_1, switches the operation that the clock signal is fed from the clock feeder 13_1 to the processing blocks 2_0 and 1.

In the eleventh embodiment, since the controller 61 is equipped with the clock monitor 62 that monitors whether the operation of the clock feeders 13 is normal as mentioned above, when the operation of the clock feeder 13 feeding the clock signal becomes abnormal, the abnormal clock feeder 13 is switched to the normal clock feeder 13 for the feeding of the normal clock signal.

Twelfth Embodiment

Figure 24:
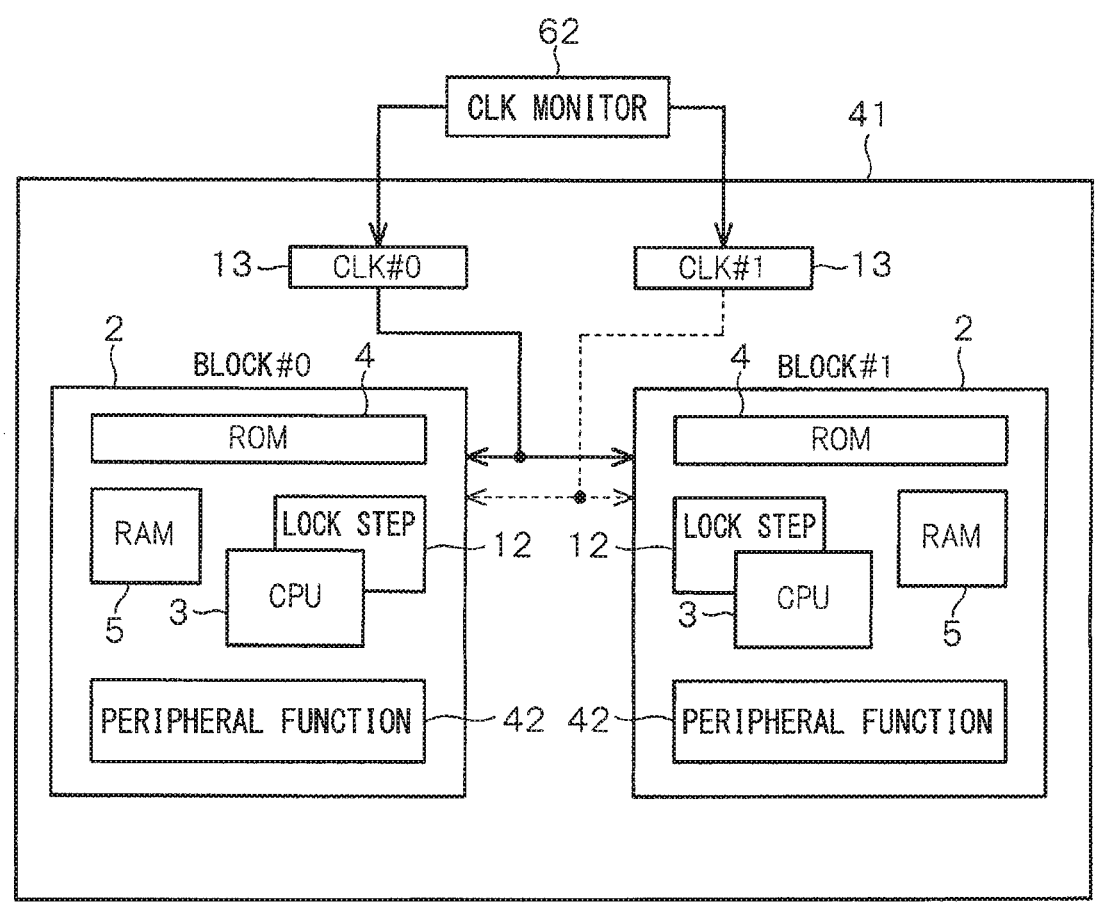
FIG. 24 is a block diagram of the microcontroller in a twelfth embodiment of the present disclosure.

The twelfth embodiment shown in FIG. 24 has a configuration in which the controller 41 of the sixth embodiment has the clock monitor 62 outside of the controller 41. In such case, the clock monitor 62 serves as an element of the ECU which is configured to have the controller 41, for example. In such configuration, in which the clock monitor 62 is provided as an external device to the controller 41, the clock monitor 62 is enabled to monitor the operation of the clock feeder 13 without being affected by an internal state of the controller 41.

Although the present disclosure has been described in connection with preferred embodiment thereof with reference to the accompanying drawings, it is to be noted that various changes and modifications become apparent to those skilled in the art.

For example, more than three processing blocks 2 may be provided.

The design of the peripheral circuits in the controller may be arbitrarily changed as a design matter.

The seventh embodiment may have the eighth and the ninth embodiments combined therewith.

The actuator driven by the microcontroller of the present disclosure is not necessarily limited to the motor. Further, the present microcontroller may be applied to an apparatus other than the electric power-steering system.

Such changes, modifications, and summarized schemes are to be understood as being within the scope of the present disclosure as defined by the appended claims.

What is claimed is:

1. A microcontroller comprising:
   at least two processing blocks provided on one semiconductor chip, each of the processing blocks including a Central Processing Unit (CPU) and a peripheral circuit, wherein the peripheral circuit included in one processing block is not accessible by the CPU included in another processing block;
   a shared memory that is accessible from the CPU in each of the at least two processing blocks, wherein the shared memory is part of a random access memory that is directly read accessible and directly write accessible, as memory, by all of the CPUs in the microcontroller;
   a plurality of clock feeders each producing a respective clock signal; and
   a plurality of switching circuits configured to alternate between feeding the at least two processing blocks one of the respective clock signals and another one of the respective clock signals.

2. The microcontroller of claim 1 further comprising:
   a lockstep core that is provided as one of the peripheral circuits.

3. The microcontroller of claim 1, wherein
   each of the processing blocks receives the respective clock signals selectively from normally-operating clock feeders.

4. The microcontroller of claim 3 further comprising:
   a clock monitor monitoring an operation of each of the plurality of clock feeders.

5. The microcontroller of claim 3, wherein
   each of the plurality of clock feeders is monitored by an external clock monitor to determine whether an operation of each of the plurality of clock feeders is normal.

6. The microcontroller of claim 1, wherein
   each of the at least two processing blocks receives the respective clock signals from a corresponding clock feeder.

7. The microcontroller of claim 1, wherein
   at least one of the plurality of clock feeders generates the respective clock signals based on an oscillation input from an externally-attached source of oscillation.

8. The microcontroller of claim 7, wherein
   the externally-attached oscillation source is an oscillator.

9. The microcontroller of claim 1, wherein
   at least one of the plurality of clock feeders generates the respective clock signals based on an oscillation input from an internal source of oscillation.

10. The microcontroller of claim 9, wherein
    the internal source of oscillation is a Micro Electro-Mechanical System (MEMS) oscillator.

11. The microcontroller of claim 1, wherein the shared memory is a random access memory (RAM).

12. An electronic control unit comprising:
    the microcontroller of claim 1, and
    a communication line multiplexed for an input of a signal to the microcontroller from a plurality of external controllers, wherein
    a drive signal for driving a same actuator is output from each of at least two processing blocks, based on the signal from the plurality of external controllers.

13. The electronic control unit of claim 12 further comprising:
    a communication monitor (a) monitoring communication between the plurality of external controllers, and corresponding processing block, and (b) determining whether communication between the plurality of external controllers and the corresponding processing block is normal; and
    a processing block selector (a) selecting a normally-operating processing block and (b) switching to the normally-operating processing block for outputting the drive signal for driving the actuator.

14. A microcontroller comprising:
    at least two processing blocks provided on one semiconductor chip, each of the processing blocks including a Central Processing Unit (CPU) and a peripheral circuit, wherein the peripheral circuit included in one processing block is not accessible by the CPU included in another processing block; and a plurality of clock feeders each producing a respective clock signal; and at least two switching circuits configured to alternate between feeding the at least two processing blocks one of the respective clock signals and another one of the respective clock signals.

15. The microcontroller of claim 14, further comprising:
a lockstep core that is provided as one of the peripheral circuits.

* * * * *